Figure 4:
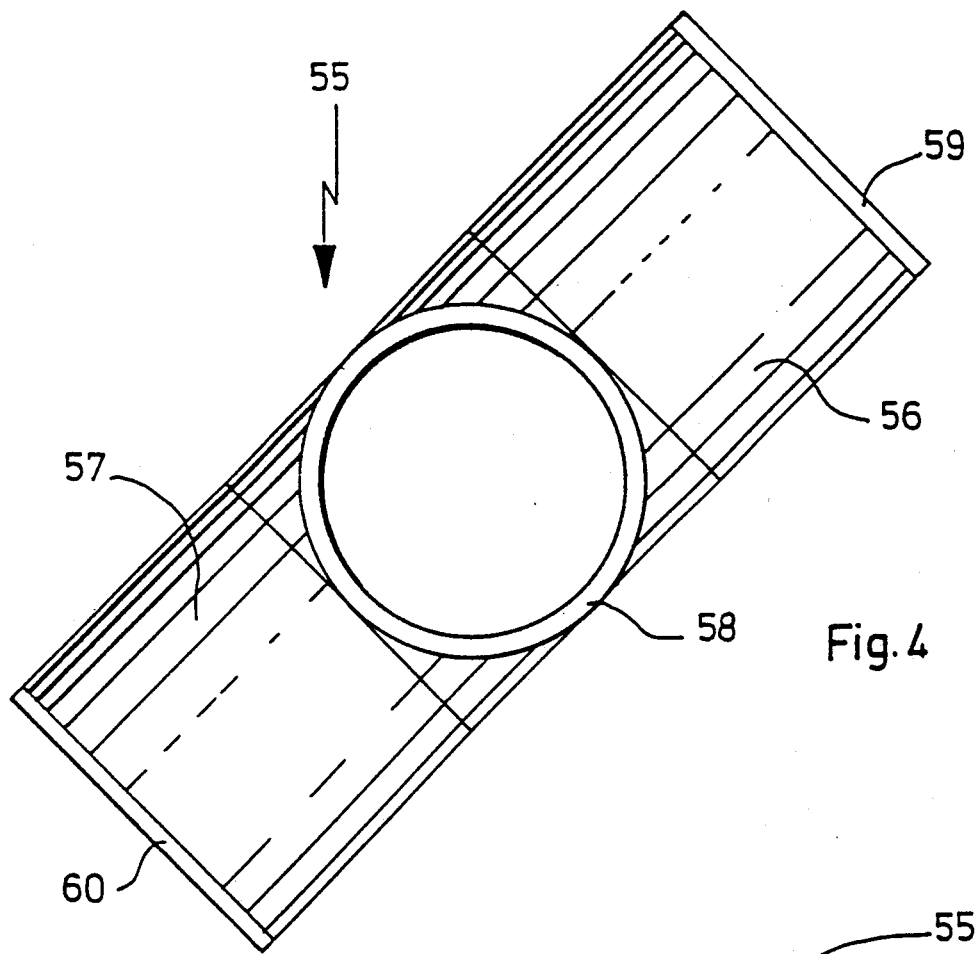

United States Patent [19]
Quittmann et al.

[11] Patent Number: 5,236,102
[45] Date of Patent: Aug. 17, 1993

[54] RE-USABLE CONTAINER

[75] Inventors: Jurgen Quittmann, Steinhagen; Herbert Abke, Stühlingen-Weizen, both of Fed. Rep. of Germany

[73] Assignee: STO Aktiengesellschaft, Stuhlingen/Weizen, Fed. Rep. of Germany

[21] Appl. No.: 812,116

[22] Filed: Dec. 20, 1991

[30] Foreign Application Priority Data

Dec. 21, 1990 [DE] Fed. Rep. of Germany ........ 4041266

[51] Int. Cl.$^5$ .............................................. B65D 25/16
[52] U.S. Cl. ...................................... 220/403; 220/408
[58] Field of Search ................... 220/403, 408, 410

[56] References Cited

U.S. PATENT DOCUMENTS

| | | | |
|---|---|---|---|
| 3,321,070 | 5/1967 | Childs | 220/403 X |
| 3,423,004 | 1/1969 | Christensson | |
| 3,648,882 | 3/1972 | Shelton | 220/403 |
| 3,905,476 | 9/1975 | Foreman | 220/403 X |
| 4,122,973 | 10/1978 | Ahern | 220/410 X |
| 4,267,928 | 5/1981 | Curry, Jr. | 220/403 X |
| 4,476,255 | 10/1984 | Bailey | |
| 4,700,867 | 10/1987 | Dutt et al. | 220/408 X |
| 4,756,046 | 7/1988 | Surface et al. | 220/408 X |
| 5,063,111 | 11/1991 | DiBello | |
| 5,137,206 | 8/1992 | Hale | 220/408 X |

FOREIGN PATENT DOCUMENTS

| | | |
|---|---|---|
| 2700230 | 1/1977 | Fed. Rep. of Germany. |
| 8027859 | 10/1980 | Fed. Rep. of Germany. |
| 9006269 | 6/1990 | Fed. Rep. of Germany. |
| 350243 | 8/1957 | Switzerland. |

Primary Examiner—Steven M. Pollard
Attorney, Agent, or Firm—James P. Hanrath; Thomas R. Vigil

[57] ABSTRACT

A re-usable container (10) is composed of a basin (11) and an insert (12). The insert (12) is formstable and is adjustably manufactured according to the inner contour of the basin (11). The insert (12) has positive fit to basin (11) and the insert (12) is made of a material which is decomposable by ultra violet rays or decomposable biologically. Re-usable containers (10) which are exposed to heavy contamination or which receive a very sticky material (13) can be re-used by using an insert (12).

13 Claims, 3 Drawing Sheets

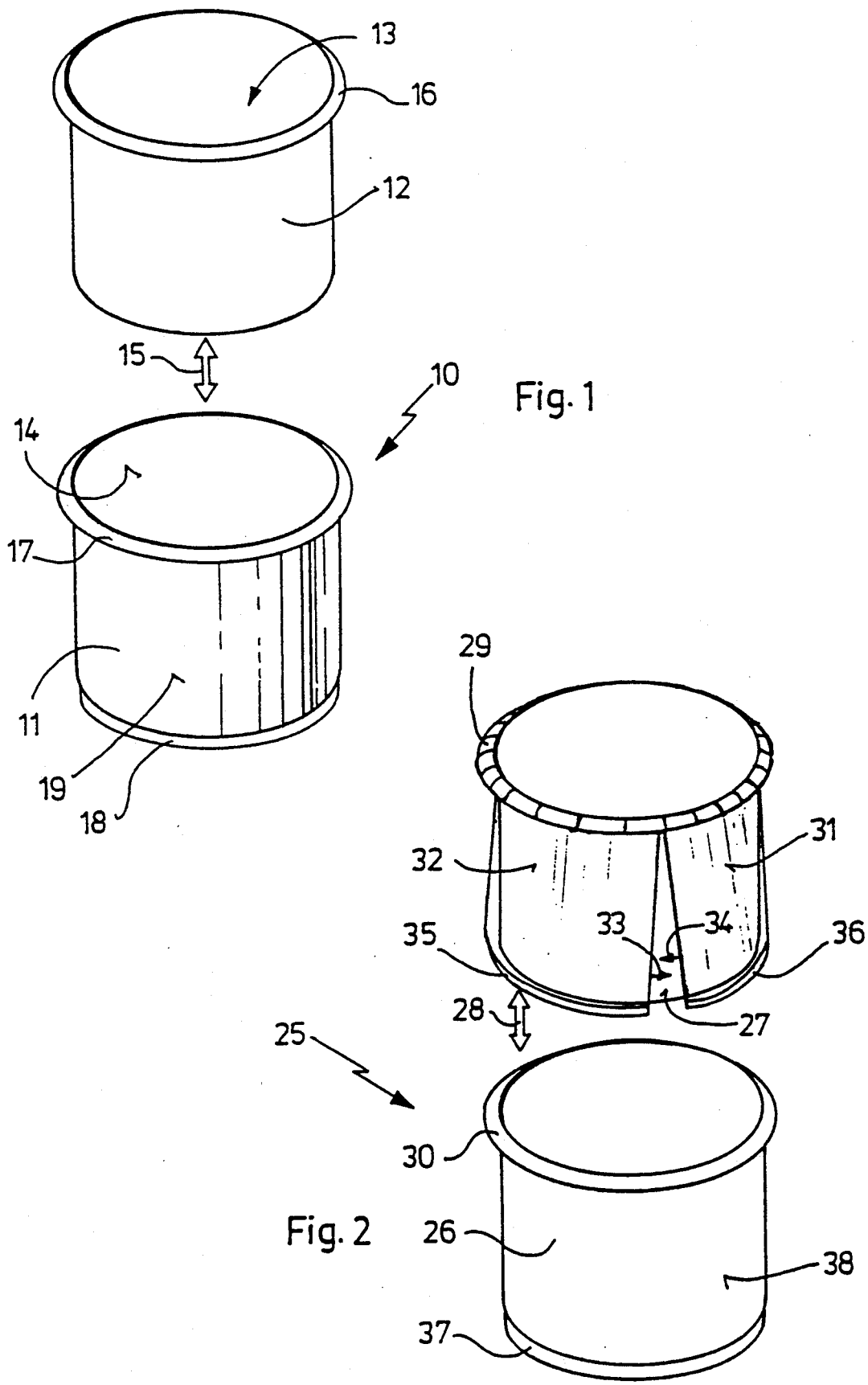

RE-USABLE CONTAINER

The present invention relates to a re-usable container comprising a basin capable of bearing and an insert, whereby that insert separates the basin from material to be accepted from the re-usable container.

Such re-usable containers are known, for example as foil-coated packing drums. Disperse systems, such as paints, adhesives, plaster and so on are filled in the known packing drums as packable, storable and transportable units. If the disperse systems, to be accepted by the packing drums, are very sticky materials, it is very time consuming to clean the packing drums before they can be re-used. During cleaning, the packing drum can be damaged and often a cleaning of the packing drum is not possible.

Furthermore, it has shown that it is not possible to mix materials with abrasive components in foil-coated packing drums, since the protecting foil will be damaged during the mixing procedure.

It is only mechanically possible by using expensive apparatuses to peel off the foil of a foil-coated packing drum and to replace the foil by a new one; during peeling the risk is taken that the foil may crack.

Since a satisfying sanitation of a great number of synthetic materials is not possible at the moment, it is necessary to re-use packing drums of any kind several times. Difficult degradable synthetic materials are simple to manufacture, have a low tare and are capable of carrying large weights. Therefore, these materials are especially suitable for containers.

It is an objective of the present invention to provide containers, which are simply and safely suitable for multiple usage.

A solution of the above mentioned objective is characterized in that the insert is formstable and has the inner contours of the basin independently therefrom.

Thereby, the re-usable container according to the present invention has the advantage that the basin which gives the packing drum its consistency does not contact the material which is filled into the packing drum. Because of the independent formstability of the insert, it is ensured that the insert cannot collapse and that the insert is always adapted to the contour of the basin. The formstable insert is capable of bearing and can be simply and easily replaced by a clean insert. Afterwards, the re-usable container can be refilled and additionally be furnished with a new usage.

In a further preferred embodiment of the present invention the insert is adjustable to an inner surface of the basin, thereby establishing a frictional engagement between the inner surface of the basin and the outer surface of the insert of the cylindrical re-usable container. This ensures that the insert is secured in the basin during a mixing procedure, even at a high mixing performance inside the re-usable container according to the present invention.

A satisfying sanitation of a dirty insert is possible, if the material of the insert is decomposable by ultra-violet radiation. The insert can also be manufactured of material which is biologically decomposable.

If the insert is provided with a first edge having a shape corresponding to the second edge of the basin and if the first edge is at least partially encasing the second edge of the basin, it is ensured that the container is tight and the container can be closed tight by using a lid having a shape corresponding to the basin.

If the insert is provided with at least one planar portion slewably attached to the insert, it is possible to cover sections of the outer surface of the basin for protection against dirt. Such an planar portion can also be used for facilitating the retraction of the dirty insert.

If the planar portions are formed to encase the outer surface of the basin completely, a material stored inside the re-usable container cannot stick neither to the inside nor to the outside surface of the basin. The planar portions can be attached to the outer surface of the basin by using adhesive strips or snap-in means which are provided in the edge zone for snapping into recesses in the basin. This is easily possible, if the basin is provided with a bottom ridge and the planar portions snap into the bottom ridge using the snap-in means during assembly of the insert to the outer surface of the basin.

If the outer surface of the insert and the inner surface of the basin are provided with reliefs having form-fittingly matching means, a much greater security is provided that the insert fits twist-proofed into the basin, also with cylindrically formed re-usable containers.

For exchanging the insert, the planar portions will be peeled off or snapped off the outer surface of the basin and the insert can be pulled off the basin by using the planar portions.

The insert, according to the present invention, is manufactured in an easy and very economical way by using the swedge process. This process allows a high fitting precision of the insert to provided contours of the basin.

It is also possible, that a basin is encased by an insert and an outer cover. Thereby, the insert as well as the outer cover is formstable. The insert and the outer cover are pushed over the basin. The outer cover 2 is made of a material which is decomposable without being harmful to the environment. If the insert as well as the outer cover are mounted to the basin, they will be connected to each other using known welding technics.

The outer cover can be provided with predetermined breaking strips to allow an easy and quick peeling off the dirty insert and outer cover of the basin.

The insert according to the present invention enables a safe protection of already manufactured vessels, packing drums, buckets and basins against contamination.

Such protected basins can be cleaned either by the user himself by exchanging the insert or dirty containers can be recycled by the retailer and can be provided with a new insert, for example mechanically. The outer cover can be printed on separately from the basin so that the basin remains neutral.

The re-usable container according to the present invention is preferably used for receiving dispersed systems, such as latex paint, resin bonded plaster and dispersion binder and/or filler. The re-usable container is used as mixing container, working container and container for transportation. Independent of the re-usable container, which is preferably made from polypropylene (PP), polyethylene (PE), polystyrene (PS), polyester (PES), polyamid (PA), the basin capable of bearing can easily be reworked, since the basin is clean and no dirt sticks on it. Also recycling of the re-usable container is advantageous, since significantly less material has to be recycled.

Further advantages arise from the specification and the attached drawing. Furthermore, the above mentioned as well as the below mentioned features can be used independently or in any combination, according to the present invention. The mentioned embodiments cannot be understood as a complete list, but have exemplary character.

Figure 5:
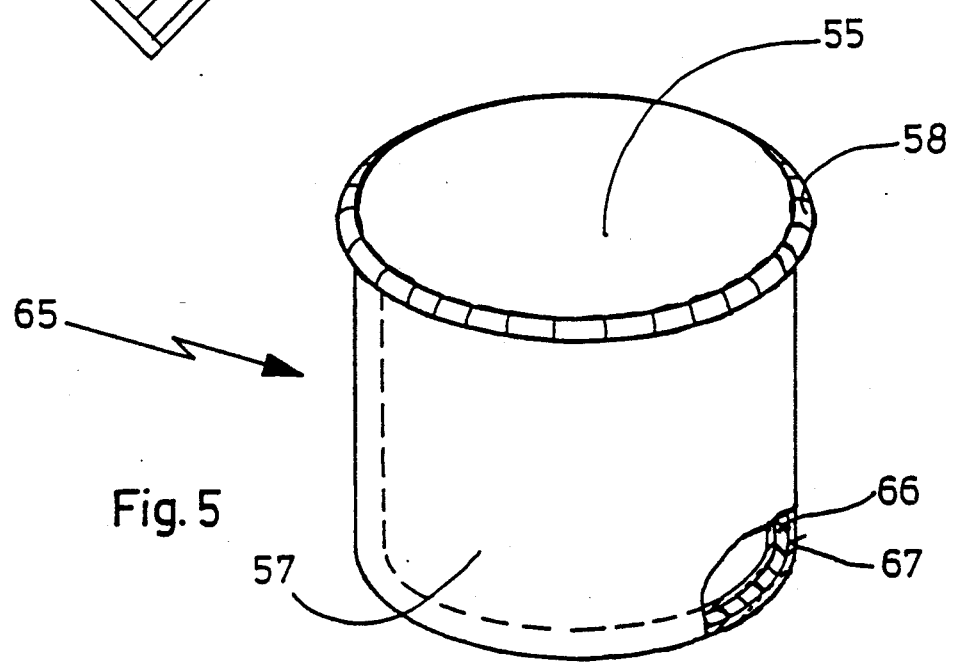
Figure 3:
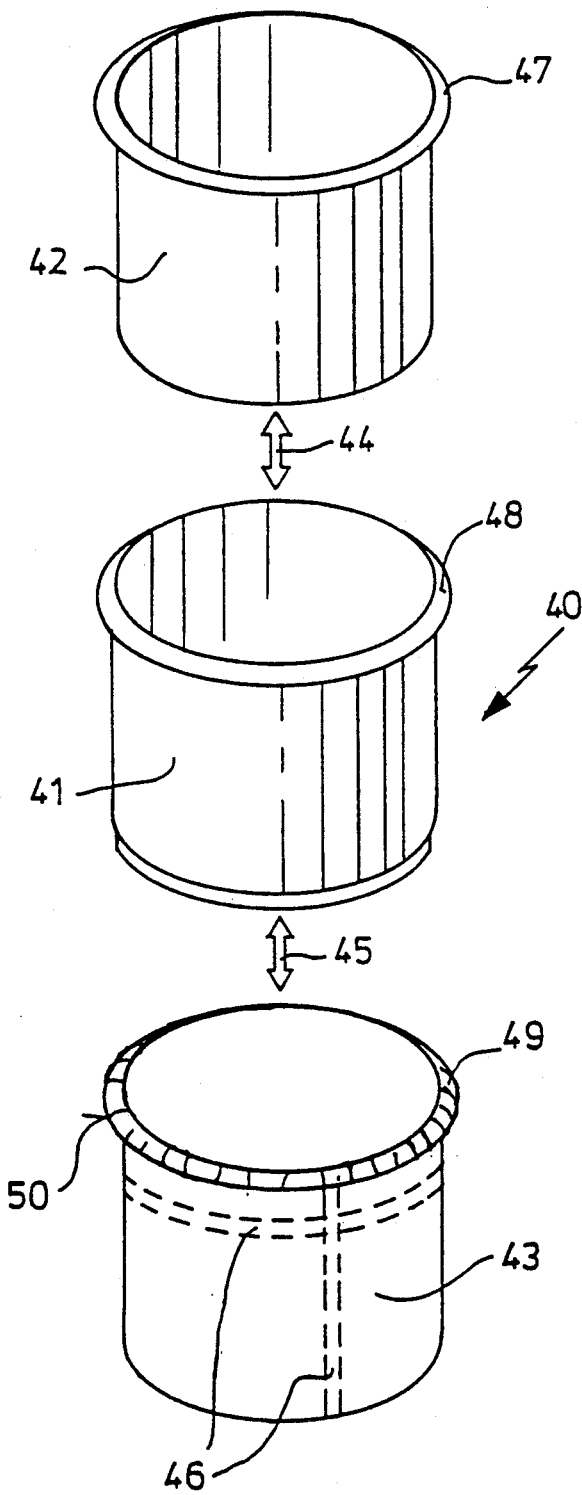
Figure 6:
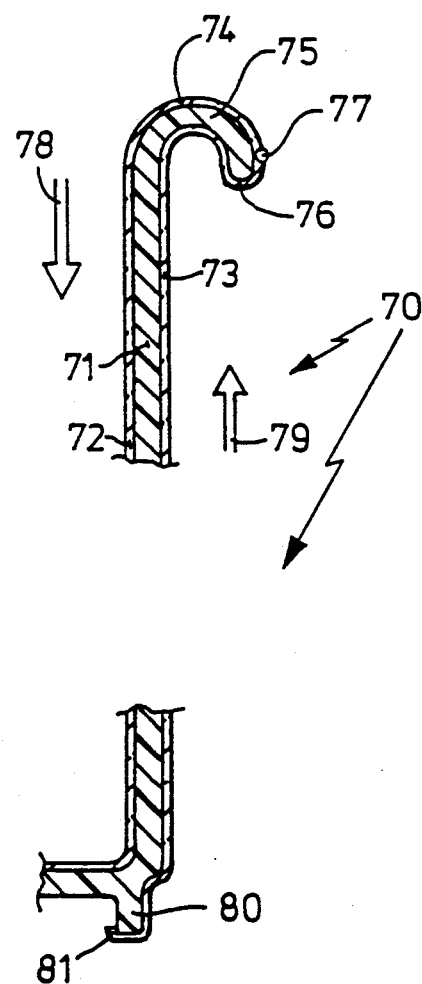

The present invention is illustrated in the drawing and described more detailed according to the preferred embodiments of the drawing. It shows:

FIG. 1 an elevated view of a re-usable container having an insert and a basin according to the present invention;

FIG. 2 a re-usable container having an insert which comprises additionally planar portions according to the present invention;

FIG. 3 another embodiment of the re-usable container according to the present invention in an elevated view having an insert and an outer cover;

FIG. 4 a top view of the an insert with unfolded planar portions according to the present invention;

FIG. 5 a re-usable container with parts cut away having an insert and an outer cover according to the present invention;

FIG. 6 a sectional view of a wall of a re-usable container according to the present invention.

The single figures of the drawing show the present invention in a diagrammatic view and are not understood to be in true scale. The parts of the single figures are shown partially enlarged or diminished, respectively, for better illustrating their structure.

FIG. 1 shows a re-usable container 10 composed of a basin 11 and an insert 12. The basin 11 can be made of polypropylene (PP), polyethylene (PE), polystyrene (PS), polyester (PES), polyamid (PA). The insert 12 is made of a synthetic material having a thickness to enable the insert to be independently formstable. The basin 11 has a thickness which is several times thicker than the thickness of the insert 12. A material 13 can be filled into the insert 12 of the re-usable container 10. The material 13 can be any dispersed system.

The insert 12 has a positive fit to an inner surface 14 of the basin 11, if the insert 12 is pushed into the basin 11 in the direction of arrow 15. In this case a first edge 16 of the insert fits on a second edge 17 of the basin. If the re-usable container, as shown in FIG. 1, has a cylindrical cross section, the positive fit of the insert 12 at the inner surface 14 of the basin 11 and the fitting of the first edge 16 on the second edge 17 establishes a frictional engagement to prevent an easy twisting of insert 12 within basin 11.

A circumferential bottom ridge 18 is provided at basin 11, so that basin 11 can be placed on a surface. An outer surface 19 of the basin 11 is not protected by a cover according to FIG. 1. The directions of arrow 15 indicate how insert 12 can be moved relative to basin 11.

FIG. 2 shows another preferred embodiment of a re-usable container 25 and shows an elevated illustration of a basin 26 separated from an insert 27. The insert 27 is movable in the directions of arrow 28. As soon as a first edge 29 matches a second edge 30 of basin 26 insertion of insert 27 into basin 26 is terminated. Planar portions 31, 32 are formed at insert 27 adjacent to the first edge 29. The planar portions 31, 32 are connected with something like flex hinges to the first edge 29 and are slewable in the direction of arrows 33, 34 relative to the first edge 29. Edge strips 35, 36 are formed on the free ends of the planar portions 31, 32. The insert 27 can be attached to a bottom ridge 37 or an outer surface 38 of basin 26 by using the edge strips 35, 36, if the insert 27 is pushed into basin 26 and if the planar portions 31 and 32 are lying close to the outer surface 38. The planar portions 31, 32 can be attached to the outer surface 38 by using adhesive strips, for example; or using snap-in means of the edge strips 35, 36 which are suitable to snap into bottom ridge 37.

FIG. 3 shows another embodiment of a re-usable container 40 having an insert 42 and an outer cover 43. The insert 42 as well as the outer cover 43 are formstable and manufactured to encase basin 41 closely and completely in a desired manner. The insert 42 and the outer cover 43 are movable relative to basin 41 in the directions of arrows 44 and 45. A predetermined breaking strip 46 is provided at the outer cover 43 for separating the outer cover 43 from the basin 41 in an easy and simple manner. If the insert 42 as well as the outer cover 43 are pushed over basin 41, a first edge 47 covers a second edge 48 of basin 41 and a third edge 49 of the outer cover 43 lays closely on the lower side of the second edge 48. The first edge 47 is coupled to the third edge 49 along a circumferential line 50 by using known means. For removing the outer cover 43 as well as insert 42 from basin 41, first of all the predetermined breaking strip 46 has to be removed and afterwards the insert 42 and the outer cover 43 can be moved in the direction of arrows 44 and 45, as shown in FIG. 3. The arrangement of the predetermined breaking strip 46, as shown in FIG. 3, is just exemplary. It can also be located at or underneath the second edge 48.

FIG. 4 shows a top view of an insert 55 having unfolded planar portions 56, 57. The planar portions 56, 57 are articulately fixed to a first edge 58. The free ends of the planar portions 56, 57 are formed like edge stripes 59, 60 for detachably attaching the planar portions 56, 57 to a basin.

FIG. 5 shows a re-usable container 56 having a basin 66. The basin 66 is encased by an insert 55. The cutaway part in FIG. 5 shows how basin 66 is encased by insert 55 and planar portion 57. The planar portion 57 lies closely to an outer surface 67 of basin 66. The planar portion 56 from FIG. 4 is covered in the illustration of FIG. 5.

FIG. 6 shows a sectional view of the wall of a re-usable container 70. A basin 71 is protected by an insert 72 and an outer cover 73. A first edge 74 of insert 72 encompasses a second edge 75 of basin 71 on their far away circumference and a third edge 76 of the outer cover 73 encompasses the second edge 75 from underneath, thereby encasing the second edge 75 completely. The insert 72 is coupled to the outer cover 73 at a circumferential line 77. Before coupling the insert 72 to the outer cover 73, for example by welding, the insert 72 and the outer cover 73 are pushed over the basin 71 in the directions of arrows 78 and 79. The outer cover 73 is adjusted to basin 71, so that as soon as the third edge 76 lies closely to the second edge 75, snap-in means 81 of the outer cover 73 snaps detachably in a bottom ridge 80 of basin 71.

The inserts and the outer covers shown in the different figures are made of a material which is either decomposable by ultra-violet rays or biologically decomposable.

A re-usable container 10 is composed of a basin 11 and an insert 12. The insert 12 is formstable and adjustably manufactured according to the inner contour of basin 11. The insert 12 has form-fit to basin 11 and the insert 12 is made of a material which is decomposable by ultra violet rays or decomposable biologically. Re-usable containers 10 which are exposed to heavy contamination or which receive a very sticky material 13 can be re-used by using an insert 12.

We claim:

1. A re-usable container for latex paint and/or plaster comprising: a stable basin (11; 26; 41; 66; 71) and a mechanically stable insert having an upper edge and a central axis (12; 27; 41; 55; 72) for insertion into said basin and for separating said basin from material (13) to be accepted by the re-usable container (10; 25; 40; 65; 70), said insert being self supportingly and dimensionably stable and its contour being adaptable to the inner surface of said basin and positive locking thereto and said insert (27; 55) having at least one planar, generally rectangular portion extending from said upper edge and perpendicular to said central axis (31, 32; 56, 57) which is slewably attached to said insert (27; 55).

2. A re-usable container according to claim 1, wherein the outer surface of said insert (12; 27; 42; 55; 72) and the inner surface of said basin (11; 26; 41; 66; 71) incorporate reliefs which have mating positive locking means.

3. A re-usable container according to claim 1, wherein said insert (12, 27; 42; 55; 72) is made of a material which is decomposable by ultra violet rays and/or decomposable biologically.

4. A re-usable container according to claim 1, wherein said insert (12; 27; 42; 55; 72) has a first edge (16; 29; 47; 58; 75) which is formed according to a second edge (17; 30; 47; 75) of said basin (11; 26; 51; 71) and which encases the second edge (17; 30; 48; 75) of said basin (11; 26; 41; 71) at least partially.

5. A re-usable container according to claim 1, wherein said planar portion (31, 32; 56, 57) can be put against at least one outer surface (38; 67) of said basin (26; 66).

6. A re-usable container according to claim 1, wherein the size of two planar portions (31, 32; 56, 57) is chosen to encase the outer surface (38; 67) of said basin (26; 66) completely when assembled.

7. A re-usable container according to claim 1, wherein said planar portion (31, 32; 56, 57) can be attached to said outer surface (38; 67).

8. A re-usable container according to claim 1, wherein said planar portion (31, 32; 56, 57) has edge strips (35, 36; 59, 60) on their free ends which can be fixed in the bottom zone of said basin (26; 66).

9. A re-usable container according to claim 8, wherein an outwardly projecting bottom ridge (18; 37; 80) or bottom ridge sections are provided at said basin (11; 26; 71) which are snap-fittingly attachable to means of said planar portions (31, 32; 56, 57).

10. A re-usable container according to claim 1, wherein an outer cover (43) is allocated to said insert (42) and both are connected with each other by a predetermined breaking strip.

11. Process for manufacturing an insert (12; 27; 42; 55; 72) according to claim 1, characterized in that said insert (12; 27; 42; 55; 72) is manufactured using a swedge process.

12. Process for encasing said basin (41) according to claim 11, characterized in that said insert (42) and said outer cover (43) are coupled with each other at said basin (41) in a first working cycle and in a second working cycle said predetermined breaking strip (46) is engraved therein.

13. A re-usable container for latex paint and/or plaster comprising:
a stable basin (11; 26; 41; 66; 71) and,
a mechanically stable insert having an upper edge and a central axis (12; 27; 42; 55; 72) for insertion into said basin and for separating said basin from material (13) to be accepted by the re-usable container (10; 25; 40; 65; 70);
said insert being self supportingly and dimensionally stable and its contour being adaptable to the inner surface of said basin and positive locking thereto;
said insert (27; 55) having at least one planar, generally rectangular portion extending from said upper edge and perpendicular to said central axis (31, 32; 56, 57) which is slewably attached to said insert (27; 55);
said planar portions (31, 32; 56, 57) encasing the outer surface (38; 67) of said basin (26; 66) completely when assembled;
said planar portions comprising edge strips (35, 36; 59, 60) on the free ends; and
said edge strips being fixable in a bottom zone of said basin (26; 66).

* * * * *

UNITED STATES PATENT AND TRADEMARK OFFICE
CERTIFICATE OF CORRECTION

PATENT NO. : 5,236,102
DATED : August 17, 1993
INVENTOR(S) : Jurgen Quittman and Herbert Abke It is certified that error appears in the above-indentified patent and that said Letters Patent is hereby corrected as shown below:

Column 2, line 38 "techics" should be -- techniques.--.

Column 4, line 32 "stripes" should be --strips--.

Column 5, line 7 "41" should be --42--.

Column 5, line 13 "thereto" should be --thereto,--.

Column 5, line 29 "75" should be --74--.

Column 5, line 30 "47" should be --48--.

Column 5, line 30 "51" should be --41--.

Column 6, line 11 "breaking strip" should be --breaking strip (46)--.

Signed and Sealed this

Fifth Day of July, 1994

Attest:

BRUCE LEHMAN

Attesting Officer

Commissioner of Patents and Trademarks